(12) United States Patent
Voorting

(10) Patent No.: US 6,585,281 B1
(45) Date of Patent: Jul. 1, 2003

(54) VEHICLE ALIGNMENT SYSTEM

(76) Inventor: Aric R. Voorting, 1055 Lonnie Raker La., Crawfordville, FL (US) 32327

( * ) Notice: Subject to any disclaimer, the term of this patent is extended or adjusted under 35 U.S.C. 154(b) by 0 days.

(21) Appl. No.: 10/059,535

(22) Filed: Jan. 30, 2002

(51) Int. Cl.[7] .................................................. B60D 1/40
(52) U.S. Cl. ........................................ 280/477; 33/264
(58) Field of Search ........................... 280/477; 33/264; 116/28 R

(56) References Cited

U.S. PATENT DOCUMENTS

| | | | | |
|---|---|---|---|---|
| 3,015,162 A | | 1/1962 | Bohnet ........................... 33/46 |
| 4,012,056 A | | 3/1977 | Christensen ................. 280/477 |
| 4,666,176 A | | 5/1987 | Sand ............................. 280/477 |
| 4,708,359 A | * | 11/1987 | Davenport ................... 280/477 |
| 4,723,788 A | | 2/1988 | Suter ............................ 280/477 |
| 4,961,590 A | * | 10/1990 | Davenport ................... 280/477 |
| 5,269,554 A | | 12/1993 | Law et al. ................... 280/477 |
| 5,558,352 A | | 9/1996 | Mills ........................... 280/477 |
| 5,596,944 A | | 1/1997 | Massie ......................... 116/28 |
| 6,042,136 A | | 3/2000 | Heinecke ..................... 280/477 |
| 6,209,902 B1 | | 4/2001 | Potts ........................... 280/477 |
| 6,273,448 B1 | | 8/2001 | Cross ........................... 280/477 |

* cited by examiner

Primary Examiner—Kevin Hurley

(57) ABSTRACT

A vehicle alignment system for properly aligning a vehicle with respect to a trailer without requiring the vehicle operator to leave the vehicle. The vehicle alignment system includes a first telescoping rod having a first base attachable to a hitch of a trailer, and a pair of telescoping rods extending from a cross member with a center magnet attached thereto for attaching to a ball. An upper member extends between the pair of telescoping rods for indicating when the ball and the hitch are properly aligned. An indicator ball is preferably attached to a distal end of each of the telescoping rods for increasing the visual indication.

20 Claims, 8 Drawing Sheets

VEHICLE ALIGNMENT SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to vehicles and trailers and more specifically it relates to a vehicle alignment system for properly aligning a vehicle with respect to a trailer without requiring the vehicle operator to leave the vehicle.

2. Description of the Prior Art

Examples of patented devices which are related to the present invention include U.S. Pat. No. 5,558,352 to Mills; U.S. Pat. No. 5,269,554 to Law et al.; U.S. Pat. No. 4,723,788 to Suter; U.S. Pat. No. 4,666,176 to Sand; U.S. Pat. No. 4,012,056 to Christensen; U.S. Pat. No. 3,015,162 to Bohnet; U.S. Pat. No. 5,596,944 to Massie; U.S. Pat. No. 6,042,136 to Heinecke; U.S. Pat. No. 6,273,448 to Cross; and U.S. Pat. No. 6,209,902 to Potts.

While these devices may be suitable for the particular purpose to which they address, they are not as suitable for properly aligning a vehicle with respect to a trailer without requiring the vehicle operator to leave the vehicle. Conventional devices are not easy to utilize and tend to be cumbersome.

In these respects, the vehicle alignment system according to the present invention substantially departs from the conventional concepts and designs of the prior art, and in so doing provides an apparatus primarily developed for the purpose of properly aligning a vehicle with respect to a trailer without requiring the vehicle operator to leave the vehicle.

SUMMARY OF THE INVENTION

In view of the foregoing disadvantages inherent in the known types of vehicle accessories now present in the prior art, the present invention provides a new vehicle alignment system construction wherein the same can be utilized for properly aligning a vehicle with respect to a trailer without requiring the vehicle operator to leave the vehicle.

The general purpose of the present invention, which will be described subsequently in greater detail, is to provide a new vehicle alignment system that has many of the advantages of the vehicle accessories mentioned heretofore and many novel features that result in a new vehicle alignment system which is not anticipated, rendered obvious, suggested, or even implied by any of the prior art vehicle accessories, either alone or in any combination thereof.

To attain this, the present invention generally comprises a first telescoping rod having a first base attachable to a hitch of a trailer, and a pair of telescoping rods extending from a cross member with a center magnet attached thereto for attaching to a ball. An upper member extends between the pair of telescoping rods for indicating when the ball and the hitch are properly aligned. An indicator ball is preferably attached to a distal end of each of the telescoping rods for increasing the visual indication.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a vehicle alignment system that will overcome the shortcomings of the prior art devices.

A second object is to provide a vehicle alignment system for properly aligning a vehicle with respect to a trailer without requiring the vehicle operator to leave the vehicle.

Another object is to provide a vehicle alignment system that reduces the amount of time required to attach a trailer.

An additional object is to provide a vehicle alignment system that reduces injury to a vehicle operator by eliminating the need to leave the vehicle during the alignment of the vehicle with respect to a trailer.

A further object is to provide a vehicle alignment system that may be utilized upon various types of trailers and vehicles.

Another object is to provide a vehicle alignment system that may be utilized upon different trailers.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
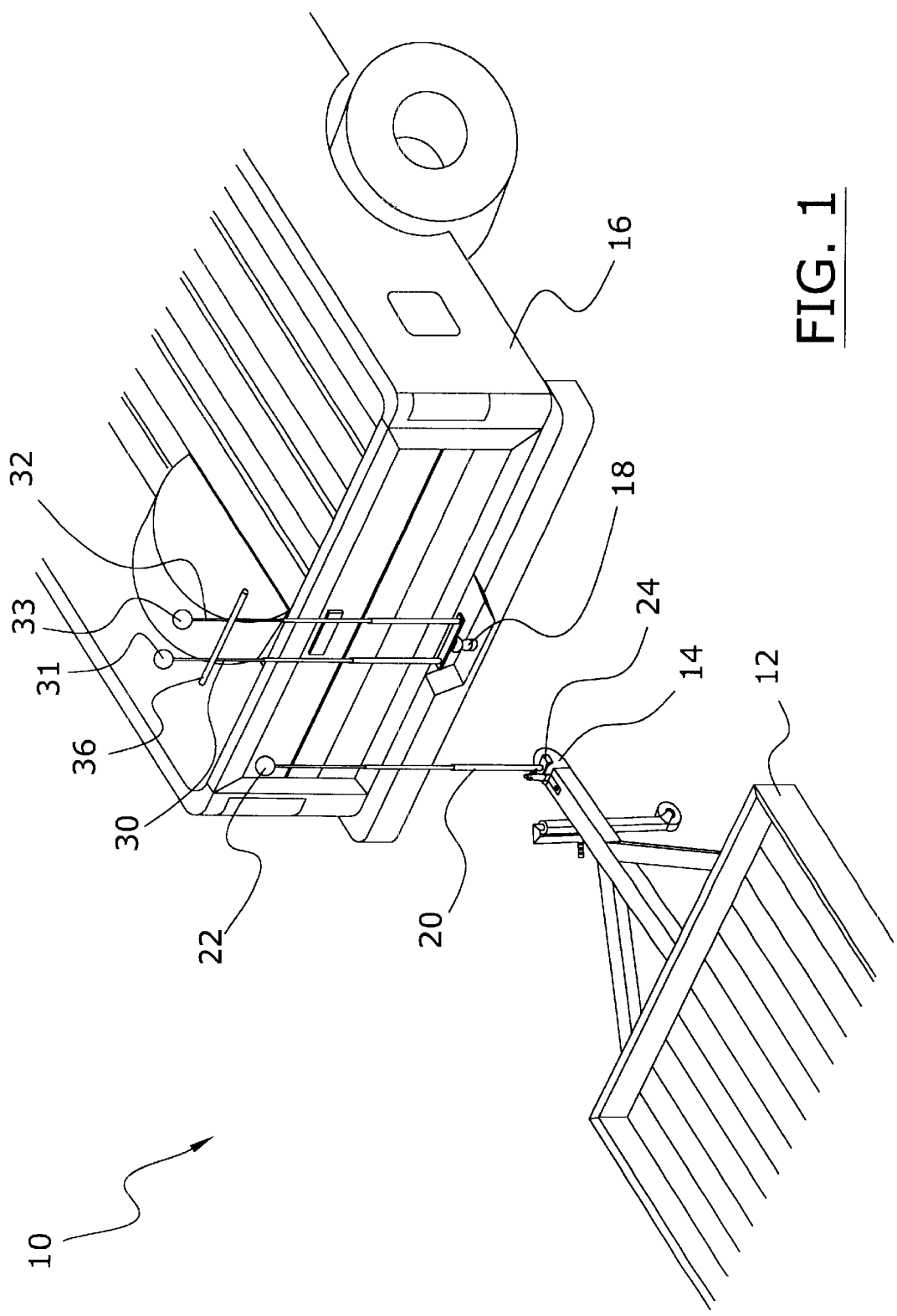
FIG. 1 is an upper perspective view of the present invention attached to a trailer hitch and a ball upon a vehicle in a separate position

Turning now descriptively to the drawings, in which similar reference characters denote similar elements throughout the several views, FIGS. 1 through 8 illustrate a vehicle alignment system 10, which comprises a first telescoping rod 20 having a first base 24 attachable to a hitch 14 of a trailer 12, and a pair of telescoping rods extending from a cross member 34 with a center magnet 38 attached thereto for attaching to a ball 18. An upper member 36 extends between the pair of telescoping rods for indicating when the ball 18 and the hitch 14 are properly aligned. An indicator ball 22, 31, 33 is preferably attached to a distal end of each of the telescoping rods 20, 30, 32 for increasing the visual indication.

Figure 2:
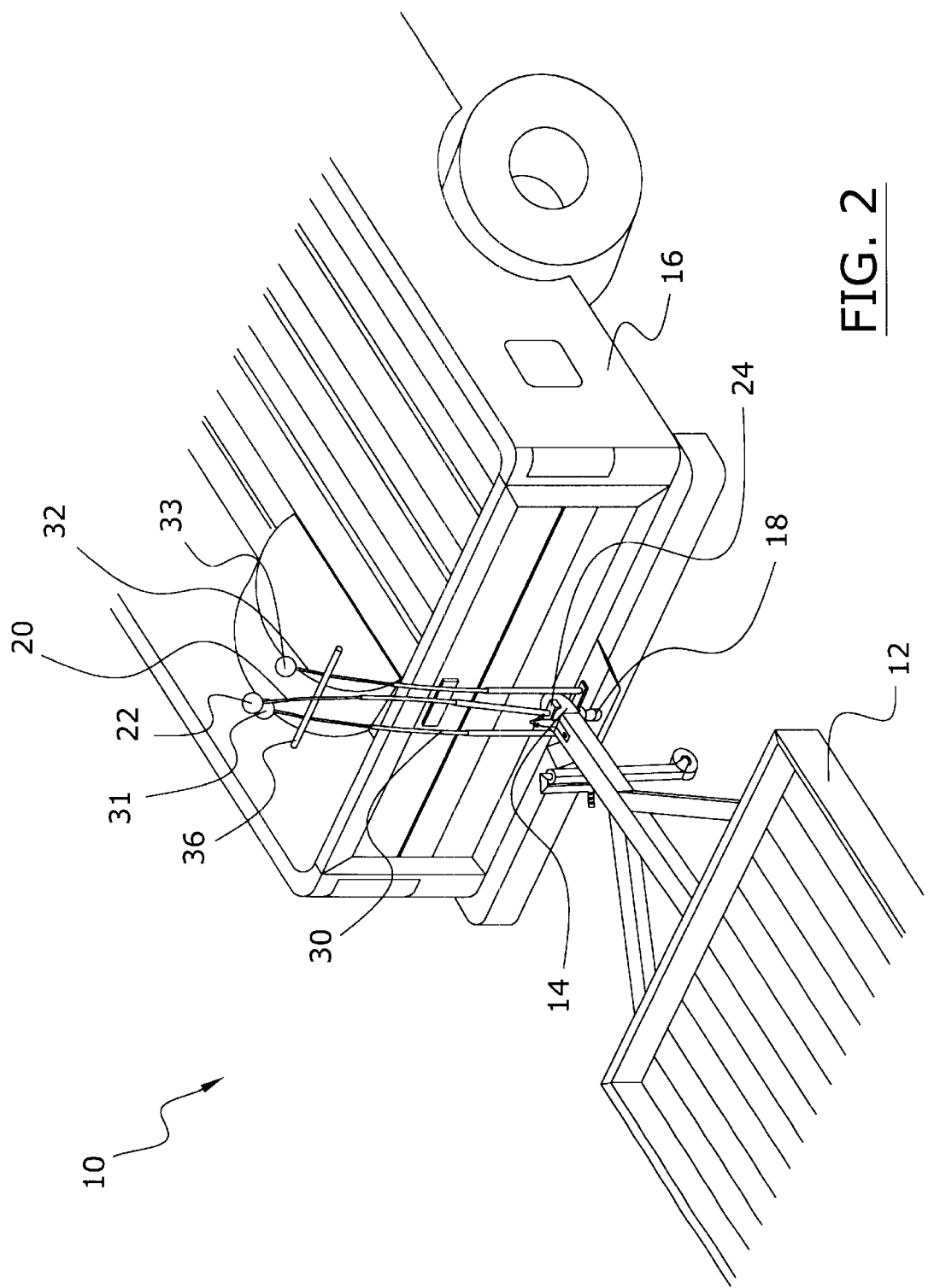
FIG. 2 is an upper perspective view of the present invention attached to a trailer hitch and a ball upon a vehicle in an engaged position with the hitch properly aligned above the ball.

As shown in FIGS. 1 through 5 of the drawings, the first telescoping rod 20 is comprised of an elongate and extendable/contractible structure. The first telescoping rod 20 is comprised of a conventional telescoping structure having a plurality of sections slidably positioned within one another. The first telescoping rod 20 preferably has a sufficient length to be viewed above the tailgate of a vehicle 16 as shown in FIGS. 1 and 2 of the drawings. It can be appreciated that a non-extendable structure may be utilized in place of the first telescoping rod 20.

As further shown in FIGS. 1 through 5 of the drawings, a first base 24 is attached to the lower end of the first telescoping rod 20. The first base 24 is comprised of a magnetic material for magnetically attaching to the hitch 14 as shown in FIGS. 1 through 5 of the drawings. The lower surface of the first base 24 is preferably curved or formed to the shape of the hitch 14 to provide a stable attachment thereof to the hitch 14 of the trailer 12.

Figure 8:
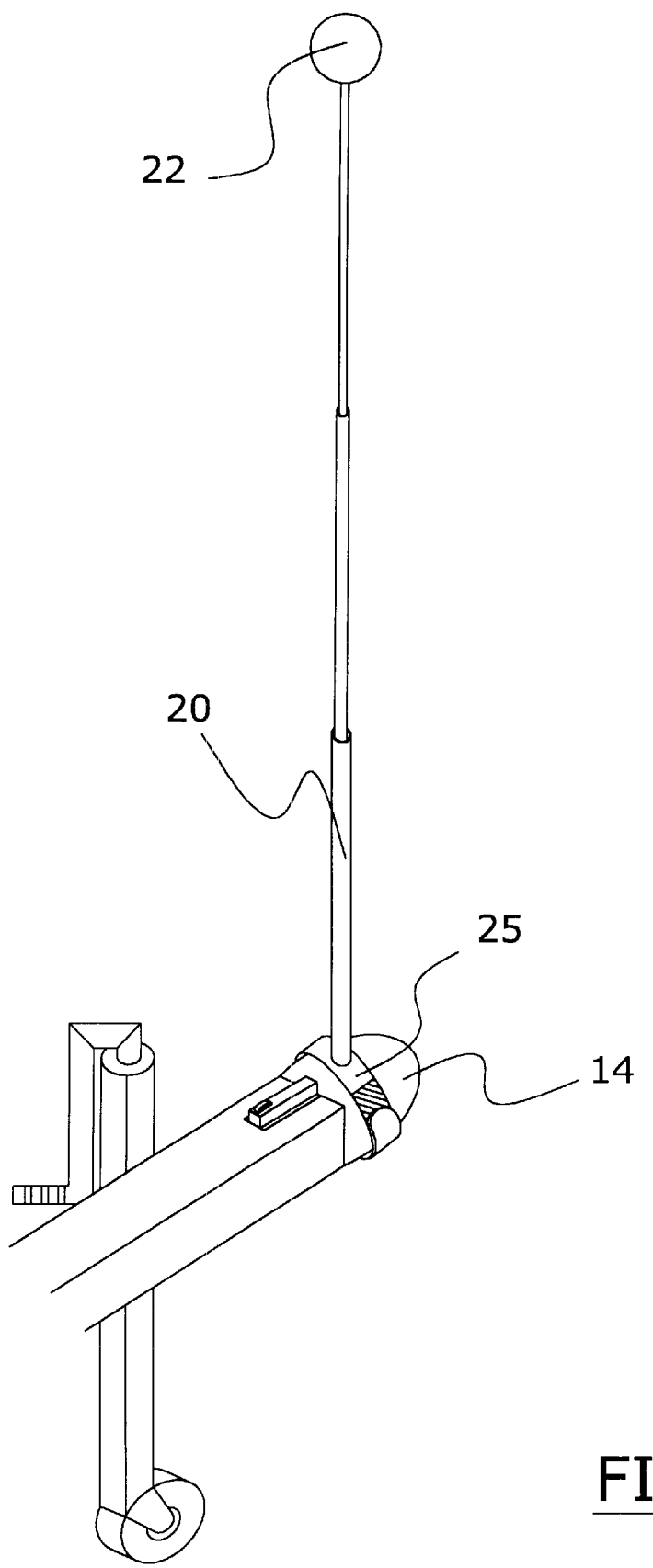
FIG. 8 is an upper perspective view of an alternative embodiment of the single telescoping pole.

FIG. 8 illustrates an alternative embodiment wherein a securing strap 25 is utilized instead of the first base 24 with respect to the first telescoping rod 20. The securing strap 25 is comprised of a length of material with a pair of opposing hook and loop fastener for snugly securing about the hitch 14 as further shown in FIG. 8 of the drawings.

As shown in FIGS. 1 through 5 of the drawings, the second telescoping rod 30 and the third telescoping rod 32 are comprised of an elongate and extendable/contractible structure similar to the first telescoping rod 20. The second telescoping rod 30 and the third telescoping rod 32 are comprised of a conventional telescoping structure having a plurality of sections slidably positioned within one another. The second telescoping rod 30 and the third telescoping rod 32 preferably have a sufficient length to be viewed above the tailgate of a vehicle 16 as shown in FIGS. 1 and 2 of the drawings. It can be appreciated that a non-extendable structure may be utilized in place of the second telescoping rod 30 and the third telescoping rod 32.

As shown in FIGS. 1 through 5 of the drawings, a cross member 34 is attached to the lower ends of the second telescoping rod 30 and the third telescoping rod 32 such that the second telescoping rod 30 and the third telescoping rod 32 extend orthogonally from the cross member 34 and substantially parallel to one another. The second telescoping rod 30 and the third telescoping rod 32 are preferably a finite distance from one another. The second telescoping rod 30 and the third telescoping rod 32 are preferably distally spaced at least 6 inches apart from one another. A center magnet 38 is preferably attached to a central lower surface of the cross member 34 for magnetically attaching to the flat upper surface of the ball 18 of a vehicle 16.

Figure 4:
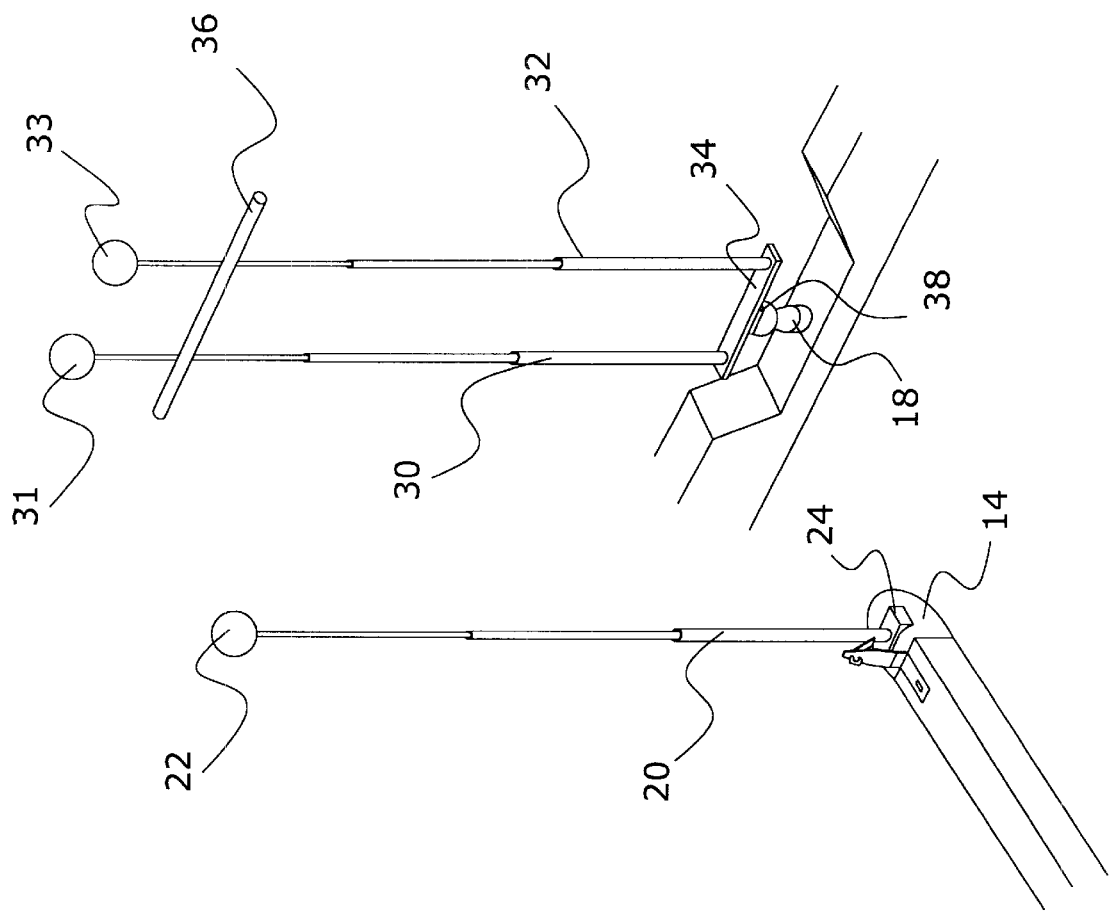
FIG. 4 is a magnified upper perspective view of the present invention attached to a trailer hitch and a ball upon a vehicle in the separate position.
Figure 5:
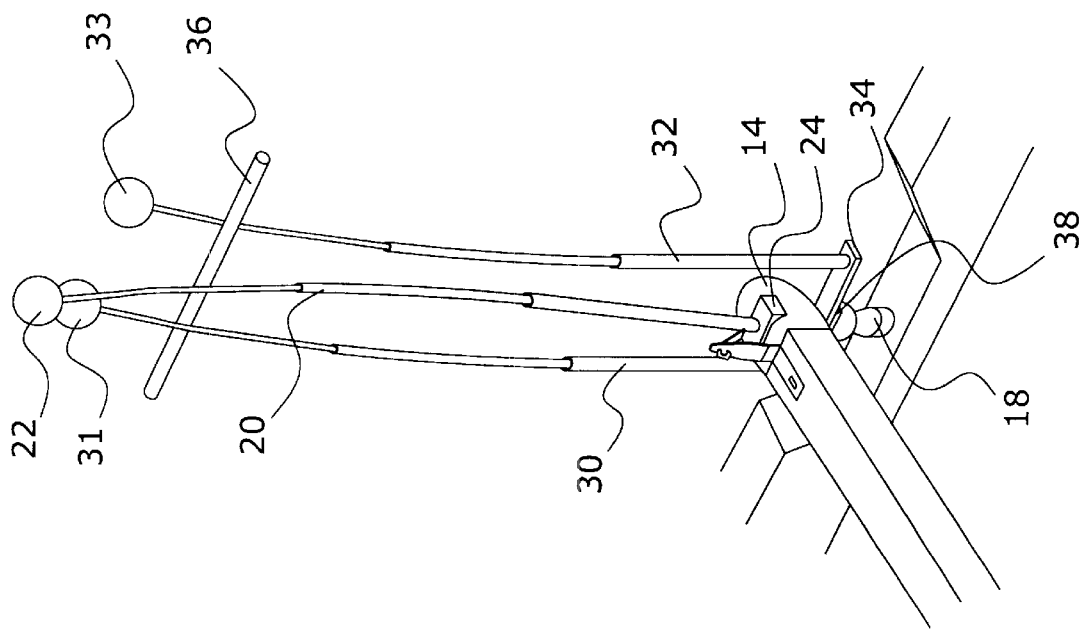
FIG. 5 is a magnified upper perspective view of the present invention attached to a trailer hitch and a ball upon a vehicle in an engaged position with the hitch properly aligned above the ball.
Figure 6:
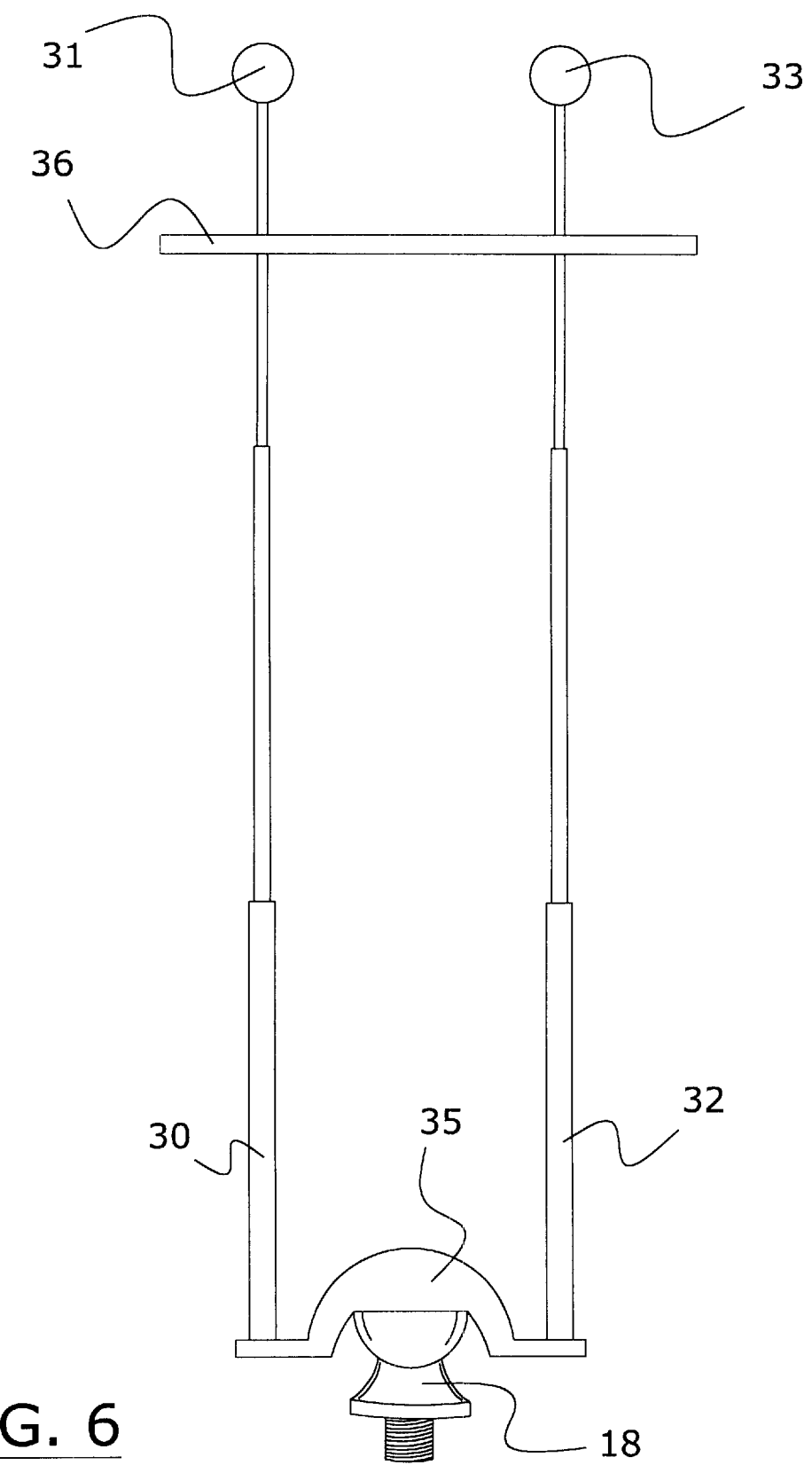
FIG. 6 is a front view of an alternative embodiment of the pair of telescoping poles.

As shown in FIGS. 1 through 6 of the drawings, an upper member 36 is attached traversely between the second telescoping rod 30 and the third telescoping rod 32. The upper member 36 is preferably attached to an upper portion of the second telescoping rod 30 and the third telescoping rod 32 so as to be visible to the operator of the vehicle 16. The upper member 36 is preferably comprised of a narrow structure that extends horizontally past the second telescoping rod 30 and the third telescoping rod 32 as best shown in FIG. 6 of the drawings.

Figure 7:
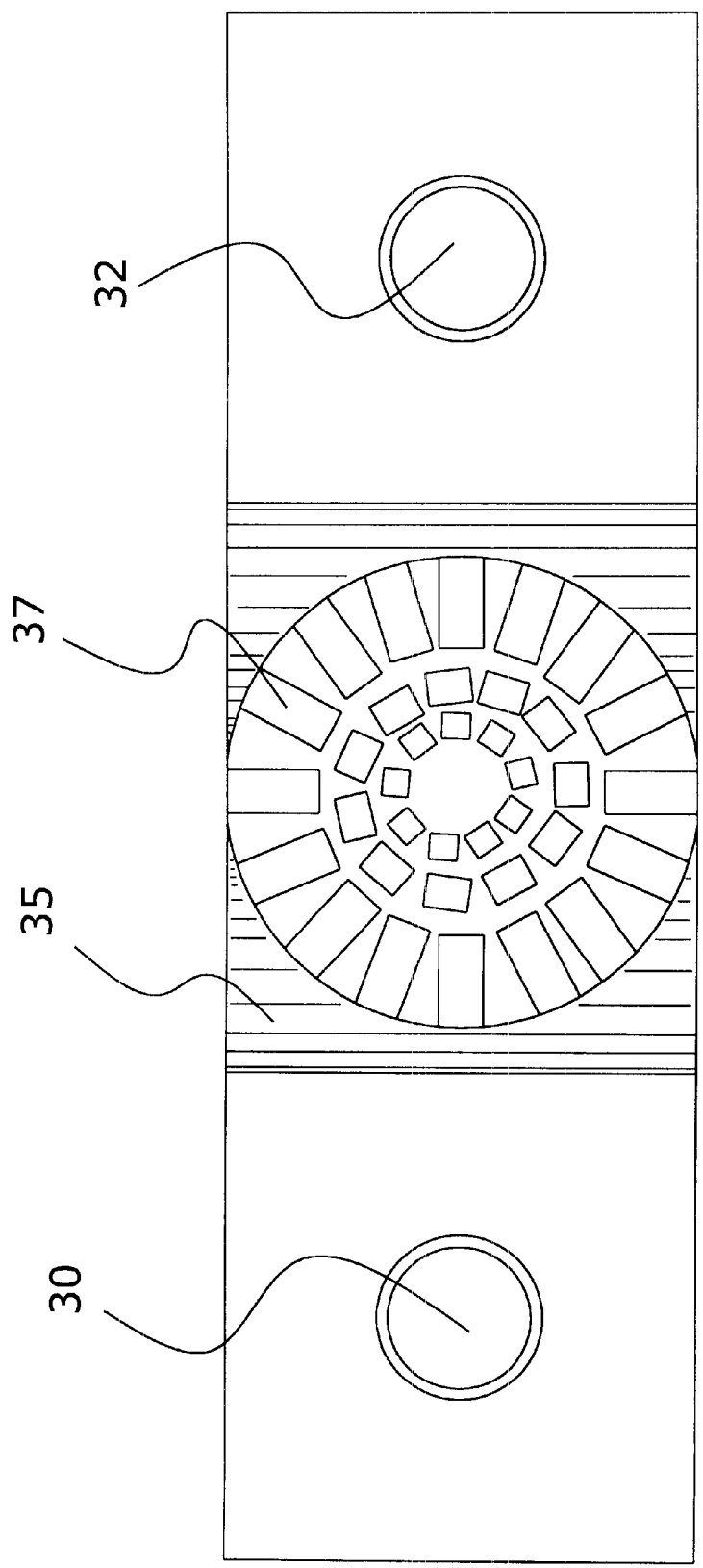
FIG. 7 is a bottom view of the alternative embodiment disclosing the recessed cavity with engagement members within.

FIGS. 6 and 7 illustrate an alternative embodiment wherein a second base 35 is utilized in place of the cross member 34 to support the second telescoping rod 30 and the third telescoping rod 32. The second base 35 is comprised of an inverted U-shaped structure as best shown in FIG. 6 of the drawings. The lower surface of the central portion has a concave section that is formed to snugly fit about the ball 18 of the vehicle 16. The concave section preferably has a plurality of flexible engaging members 37 which frictionally engage the ball 18 when the second base 35 is properly positioned upon the ball 18.

As shown in FIGS. 1 through 5 of the drawings, a first ball 22 is attached to by the upper distal end of the first telescoping rod 20. The first ball 22 is preferably comprised of a visible material and may be comprised of a bright color such as fluorescent orange. A second ball 31 and a third ball 33 are also preferably attached to the upper distal ends of the second telescoping rod 30 and the third telescoping rod 32 respectively as further shown in FIGS. 1 through 6 of the drawings. The balls 22, 31, 33 may have various shapes and sizes.

Figure 3:
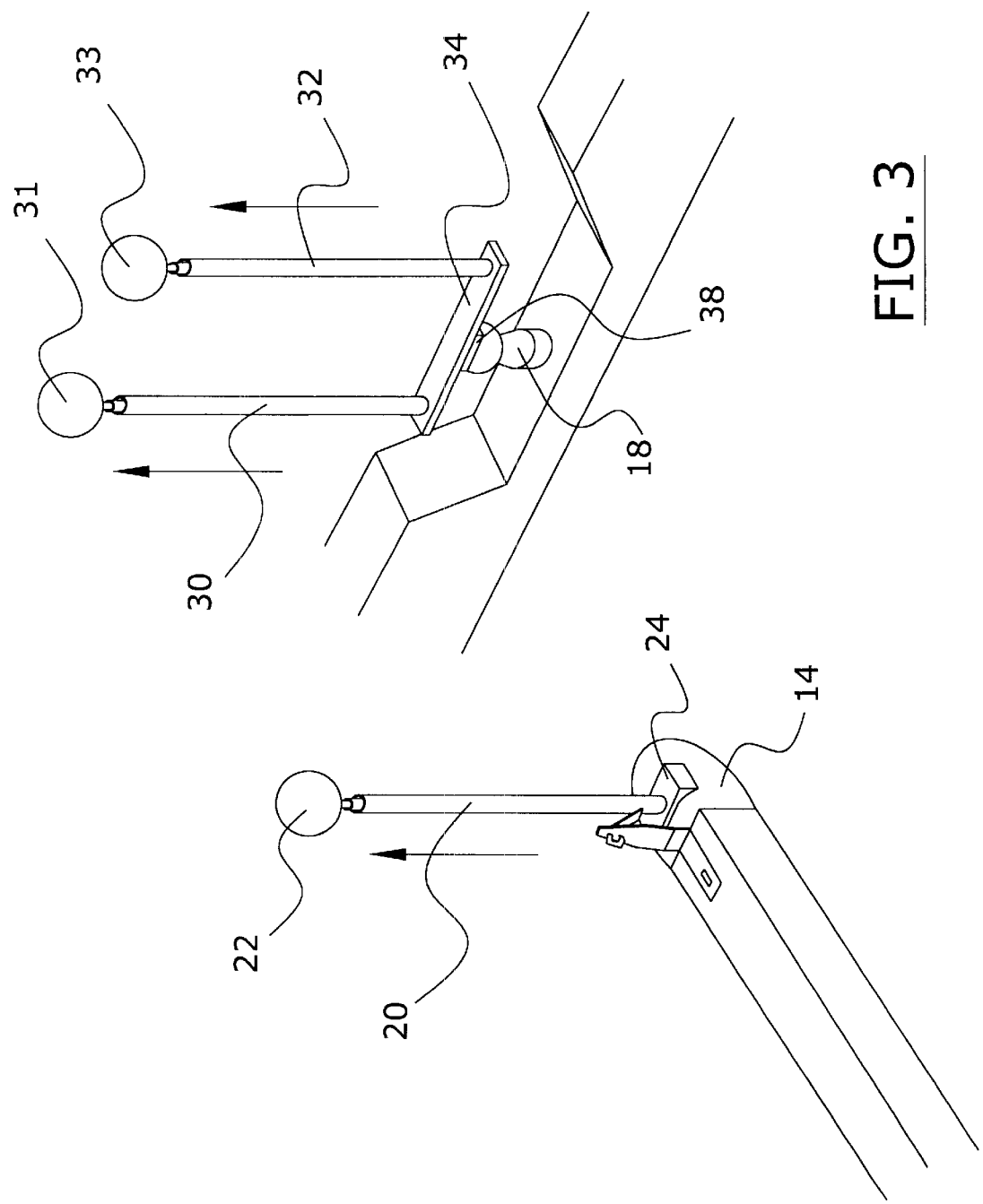
FIG. 3 is a magnified upper perspective view of the present invention attached to a trailer hitch and a ball upon a vehicle in a contracted position.

In use, the user attaches the first telescoping rod 20 to the hitch 14 of the trailer 12. The user then attaches the second telescoping rod 30 and the third telescoping rod 32 to the ball 18 of the vehicle 16 as shown in FIGS. 1, 3 and 4 of the drawings. The user then extends the telescoping rods 20, 30, 32 to the desired vertical length, such as four feet, such that the operator of the vehicle 16 can easily view the telescoping rods 20, 30, 32. The operator of the vehicle 16 then controls the vehicle 16 based upon the visual indication provided by the telescoping rods 20, 30, 32 and the balls 22, 31, 33. For example, if the first telescoping rod 20 is positioned to the left of the center of the upper member 36, the operator of the vehicle 16 would adjust the direction of the vehicle 16 accordingly until the first telescoping rod 20 was centrally aligned within the second telescoping rod 30 and the third telescoping rod 32. The operator of the vehicle 16 continues to operate the vehicle 16 until the first telescoping rod 20 engages the upper member 36 thereby indicating proper alignment of the hitch 14 and ball 18 as shown in FIGS. 2 and 5 of the drawings. The user may then remove the telescoping rods 20, 30, 32 for use at a later time.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicle alignment system for aligning a ball of a vehicle with a hitch of a trailer, comprising:

a first base attachable to said hitch of said trailer;

a first rod extending upwardly from said first base;

a second base attachable to said ball of said vehicle;

a second rod and a third rod extending upwardly from said second base substantially parallel to one another; and an upper member attached traversely to an upper portion of said first rod and said second rod, wherein said upper member has a horizontal structure.

2. The vehicle alignment system of claim 1, wherein said first rod is comprised of a telescoping structure.

3. The vehicle alignment system of claim 2, wherein said first rod has a fully extended length of at least three feet.

4. The vehicle alignment system of claim 1, wherein said second rod and said third rod are comprised of a telescoping structure.

5. The vehicle alignment system of claim 4, wherein said second rod and said third rod have a fully extended length of at least three feet.

6. The vehicle alignment system of claim 1, wherein said upper member extends outwardly from both said first rod and said second rod.

7. The vehicle alignment system of claim 1, wherein said first base is comprised of a magnetic material for magnetically attaching to said hitch.

8. The vehicle alignment system of claim 7, wherein a lower surface of said first base has a curved structure.

9. The vehicle alignment system of claim 1, wherein said second base is comprised of a horizontal structure.

10. The vehicle alignment system of claim 1, wherein said second base is comprised of a n inverted U-shaped structure having a lower cavity containing a plurality of engaging members for snugly receiving said ball of said vehicle.

11. A vehicle alignment system for aligning a ball of a vehicle with a hitch of a trailer, comprising:

a first base attachable to said hitch of said trailer;

a first rod extending upwardly from said first base;

a first indicator attached to an upper end of said first rod;

a second base attachable to said ball of said vehicle;

a second rod and a third rod extending upwardly from said second base substantially parallel to one another;

a second indicator attached to an upper end of said second rod;

a third indicator attached to an upper end of said third rod; and an upper member attached traversely to an upper portion of said first rod and said second rod, wherein said upper member has a horizontal structure.

12. The vehicle alignment system of claim 11, wherein said first rod is comprised of a telescoping structure.

13. The vehicle alignment system of claim 12, wherein said first rod has a fully extended length of at least three feet.

14. The vehicle alignment system of claim 11, wherein said second rod and said third rod are comprised of a telescoping structure.

15. The vehicle alignment system of claim 14, wherein said second rod and said third rod have a fully extended length of at least three feet.

16. The vehicle alignment system of claim 11, wherein said upper member extends outwardly from both said first rod and said second rod.

17. The vehicle alignment system of claim 11, wherein said first base is comprised of a magnetic material for magnetically attaching to said hitch.

18. The vehicle alignment system of claim 17, wherein a lower surface of said first base has a curved structure.

19. The vehicle alignment system of claim 11, wherein said second base is comprised of a horizontal structure.

20. The vehicle alignment system of claim 11, wherein said second base is comprised of an inverted U-shaped structure having a lower cavity containing a plurality of engaging members for snugly receiving said ball of said vehicle.

* * * * *